(12) United States Patent
He et al.

(10) Patent No.: US 6,381,288 B1
(45) Date of Patent: Apr. 30, 2002

(54) METHOD AND APPARATUS FOR RECOVERING DATA FROM A DIFFERENTIAL PHASE SHIFT KEYED SIGNAL

(75) Inventors: Ming He, Houston; Ce Richard Liu, Sugarland, both of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/182,925

(22) Filed: Oct. 30, 1998

(51) Int. Cl.$^7$ ............................................. H04L 27/22
(52) U.S. Cl. ........................................ 375/330; 329/304
(58) Field of Search ................................. 375/330, 324, 375/329, 331, 332, 279, 283; 329/304

(56) References Cited

U.S. PATENT DOCUMENTS

| | | | |
|---|---|---|---|
| 3,991,377 A | * 11/1976 | Salazar et al. ............... 329/304 |
| 3,993,956 A | * 11/1976 | Gilmore et al. .............. 375/330 |
| 4,606,051 A | 8/1986 | Crabtree et al. .............. 375/86 |
| 5,347,225 A | 9/1994 | Graham ....................... 324/523 |
| 5,365,515 A | 11/1994 | Graham ........................ 370/17 |
| 5,379,005 A | 1/1995 | Aden et al. .................... 333/24 |
| 5,422,919 A | 6/1995 | Graham ....................... 375/200 |
| 5,450,594 A | 9/1995 | Aden et al. ............. 395/200.06 |
| 5,467,061 A | 11/1995 | Aden et al. ................ 333/24 R |
| 5,550,506 A | 8/1996 | Tsumura ...................... 329/304 |
| 5,587,692 A | 12/1996 | Graham et al. ................ 333/12 |
| 5,696,790 A | 12/1997 | Graham et al. ............. 375/238 |
| 5,828,707 A | * 10/1998 | Urabe et al. ................. 375/330 |
| 6,055,281 A | * 4/2000 | Hendrickson et al. ....... 375/329 |

OTHER PUBLICATIONS

Texas Instruments; "Implementing a π/4 Shift D–QPSK Baseband Modem Using the TMS320C50"; Sep. 1996; pp. 1–40.
3Com Corp. website, Robyn Aber; "xDSL Supercharges Copper"; Mar. 1997; pp. 1–5.
Tut Systems website; "Simply delivering xDSL . . . connecting the local loop to the campus, the high rise and throughout the home."; website update Nov. 3, 1997; pp. 1–6.
Zona Research, Inc.; "Compaq Hits Homerun with Tut"; Aug. 11, 1998; pp. 1–2.

* cited by examiner

Primary Examiner—Temesghen Ghebretinsae
(74) Attorney, Agent, or Firm—Conley, Rose & Tayon, P.C.

(57) ABSTRACT

A receiver for receiving an analog signal that is digitally modulated using differential binary phase shift keying (DBPSK) and demodulated by a quadrature demodulator into two signals. The receiver converts the two signals into two digital signals using 2-bit analog-to-digital converters. Samples of these digital signals are then encoded according to a maximum likelihood criteria algorithm and decisions are made based on the signal constellation, which identifies the original data transmitted.

9 Claims, 1 Drawing Sheet

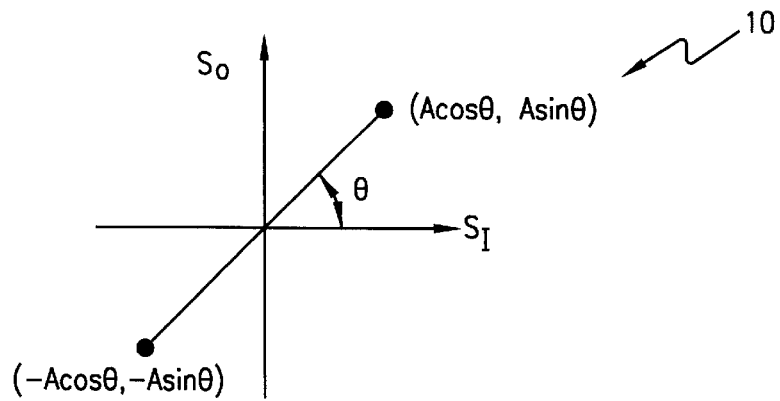
FIG. 1
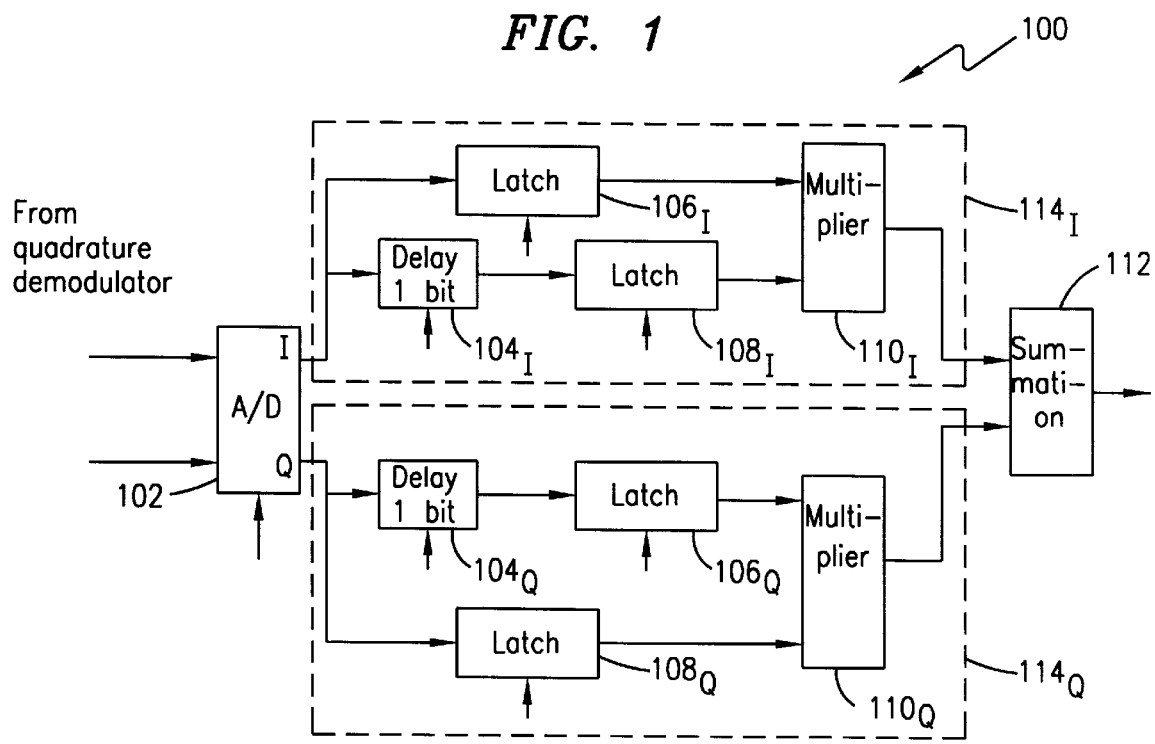
FIG. 2
FIG. 3

METHOD AND APPARATUS FOR RECOVERING DATA FROM A DIFFERENTIAL PHASE SHIFT KEYED SIGNAL

FIELD OF THE INVENTION

The present invention relates to data communications, and more particularly, to methods and arrangements for recovering digitally modulated data in a differential phase shift keyed signal.

BACKGROUND OF THE INVENTION

Differential phase shift keying (DPSK) is a digital modulation technique that is used to encode information in a signal prior to transmitting the signal to one or more receivers. The information in a DPSK modulated signal is carried by the transition between distinct digital states rather than the absolute digital state, hence the term differential. There are several DPSK modulation techniques, including, for example, differential binary phase shift keying (DBPSK) and differential quadrature phase shift keying (DQPSK).

In DBPSK modulation, the phase of a constant amplitude carrier signal shifts between two positions, for example, 0 degrees and 180 degrees. As such, two distinct digital states are provided, for example, a binary "0" at 0 degrees and a binary "1" state at 180 degrees.

In DQPSK modulation, the phase of a constant amplitude carrier signal shifts between four positions, typically in increments of 90 degrees (e.g., 45, 135, −135 and −45 degrees). As such, DQPSK signals typically provide four distinct digital states, for example, a binary "00" at 45 degrees, a binary "01" at 135 degrees, a binary "10" at 225 degrees (or −135 degrees), and a binary "11" at 315 degrees (or −45 degrees).

In both DBPSK and DQPSK, information is differentially encoded in the transition from one state to the next, and/or a lack of thereof. As such, there is no need to recover or track the carrier signal within the receiver, as there would be in a receiver that is configured to demodulate conventional phase shift keyed signals. Instead, the receiver only needs to identify the relative phase shift between two adjacent bits to identify the information contained in a differentially encoded signal. This tends to simplify the design of the receiver. For example, a single channel receiver can be used to receive and demodulate a DBPSK signal.

There are, however, problems with single channel receivers. For example, a single channel receiver needs to provide an accurate delay time between bits in order to properly detect the phase shift and demodulate the signal. Further, small differences or jitters in the delay time tend to increase the resulting bit error rate (BER).

To avoid such problems quadrature demodulation of DBPSK signals can be employed. By applying quadrature demodulation techniques to a DBPSK signal, phase vectors are produced, which form a constellation when mapped on to a complex plane. The location of the resulting data points in the constellation can then be used to identify the "true" value of the originally encoded data.

Identifying the "true" value of the originally encoded data is further complicated by changes that occur to the DBPSK signal during transmission. For example, the medium through which the signal is transmitted typically alters the signal by "twisting" or otherwise changing the phase if either the sine and/or cosine signals within the transmitted signal. As such, the received phase of one or more of the components in the received signal may be different from the transmitted phase.

To correct for unwanted phase changes, the sender and receiver will typically attempt to characterize the affects of the medium during an initial transmission sequence. For example, the sender may send a series of differentially encoded binary 1's to the receiver for a specified duration. The receiver will then attempt to recognize the series and possibly identify the characteristics of the medium. A conventional receiver accomplishes this by sampling the received signal and applying certain decisions, for example, using logic circuitry, to increase the probability of correctly determining the original data sent based on the constellation. Such decisions can be represented in a decision or constellation table.

Since there are many dynamic and static factors involved in a transmission, different constellation tables (and logic) have been created in an effort to provide reduced BERs. For example, in certain receivers advanced logic is combined with highly accurate analog-to-digital converters to sample the received analog sine and/or cosine signals and determine the vector intercepts in the constellation. While such complex receivers tend to have lower BERs, they can be very costly.

Therefore, as can be appreciated, there is a continuing need for improved methods and apparatus for use in receiving DPSK signals. Preferably, the methods and apparatus will be simple and cost effective to implement, while also providing acceptably low BERs.

SUMMARY OF THE INVENTION

In accordance with certain aspects of the present invention, methods and apparatus are provided that allow differential encoded phase shift keyed signals to be received, demodulated and decoded using simple, cost effective sampling, decoding and decision techniques that result in a reasonably low bit error rate (BER).

For example, in accordance with one aspect of the present invention, an analog signal that is digitally modulated using differential binary phase shift keying (DBPSK) and transmitted over a communication medium, is demodulated by a quadrature demodulator into two signals that are then converted into two digital signals using 2-bit analog-to-digital converters. Samples of these digital signals are then encoded according to a maximum likelihood criteria algorithm and decisions are made based on the signal constellation, which identifies the original data transmitted.

In accordance with further aspects of the present invention, a method is provided for accurately identifying the original data within a differential phase shift keyed (DPSK) signal. The method includes the steps of taking a first digital sample of at least a portion of the DPSK signal at a first time, and taking a second digital sample of the at least a portion of the DPSK signal at a subsequent second time. Then the method includes producing a coded digital sample from the first and second digital samples. In accordance with certain further embodiments of the present invention, the first and second digital samples are 2-bit digital samples resulting from an analog-to-digital conversion of portions of the DPSK signal at different, closely-spaced, times, such as, for example, 100 nanoseconds apart. In accordance with still other embodiments of the present invention, the coded digital sample is produced by combining the 2-bit first digital sample with the 2-bit second digital sample to produce a 4-bit coded digital sample. In accordance with still further embodiments of the present invention, the apparatus also includes a receiver that is configured to receive a transmitted DPSK signal and output at least a portion of the transmitted DPSK signal to the sampler as the DPSK signal.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is constellation chart depicting the intersection in the complex plane for a phase shift keyed (PSK) signal shifting between two distinct digital data values, namely "0" and "1";

FIG. 2 is a block diagram depicting a receiving system configured to receive a differential phase shift keyed (DPSK) signal and reproduce the distinct digital data values contained therein; and FIG. 3 is a table containing decision information that can be implemented to identify the distinct digital data values contained within a DPSK signal.

DETAILED DESCRIPTION

Referring now to FIG. 1, there is illustrated a constellation chart 10 depicting the intersection in the complex plane for a differential binary phase shift keyed (DBPSK) signal shifting between two distinct digital data values, namely "0" and "1", in accordance with certain embodiments of the present invention.

It has been found that the best demodulator for DBPSK signals, such as that Represented in FIG. 1, is a coherent demodulator. The coherent demodulator can be implemented by using a quadrature demodulator. For a DBPSK signal, the same symbol with the previous encoder output is symbolized as (Acos θ, and Asin θ), and the different symbol with the previous encoder output is (-Acos θ, and -Asin θ). In each case, "A" is the amplitude and θ is an unknown phase. The DBPSK signal is plotted in the signal space as shown in FIG. 1. The receiver measures the coordinates ($S_{I0}$, and $S_{Q0}$) at time $t=T_b$, and subsequent coordinates ($S_{I1}$, and $S_{Q1}$) at time $t=2T_b$. For DBPSK, due to its differential nature, the task of detection is to decide if these two vectors are roughly in the same direction or not. If they are in the same direction, then a "1" is detected. Otherwise, if there not in the same direction, then a "0" is detected. Using inner product of the vector $S_0$ and $S_1$, this detection method is mathematically expressed as follows:

If $S_0^T S_1 > 0$, then a "1" is detected; (equation #1)

If $S_0^T S_1 < 0$, then a "0" is detected; (equation #2)

wherein superscript "T" denotes the transpose of the vector.

Thus, equations 1 and 2 can be expressed equivalently as:

If $[(S_{I0}+S_{I1})^2+(S_{Q0}+S_{Q1})^2-(S_{I0}-S_{I1})^2-(S_{Q0}-S_{Q1})^2]>0$, then a "1" is detected; (equation #3)

If $[(S_{I0}+S_{I1})^2+(S_{Q0}+S_{Q1})^2-(S_{I0}-S_{I1})^2-(S_{Q0}-S_{Q1})^2]<0$, then a "0" is detected. (equation #4)

Referring now to FIG. 2, there is depicted a block diagram of an exemplary DBPSK receiver 100 that takes advantage of equations 1 through 4 in receiving and processing a DBPSK signal, in accordance with the principles of tile present invention. DBPSK receiver 100 reproduces the distinct digital data values originally encoded within the DBPSK signal. As illustrated the DBPSK receiver 100 is separated into in-phase components $104_I$–$110_I$ and quadrature-phase components $104_Q$–$110_Q$. Many of these components in DBPSK receiver 100 are clocked circuits/functions, as depicted by the clock input's open arrows. The clock is preferably recovered from the received composite signal using a conventional clock recovery circuit (not shown).

With this in mind, DBPSK receiver 100 includes an analog-to-digital (A/D) converter 102 that receives an analog in-phase (I) signal and an analog quadrature-phase signal (Q), for example, from a quadrature-phase demodulator (not shown). A/D converter 102 converts the I and Q analog signals into digital bits or digital signals. In accordance with certain preferred embodiments of the present invention, A/D converter outputs samples of each of the signals (I and Q) at approximately the same time, for example, once every 100 nanoseconds, and outputs a 2-bit digital sample for each signal.

The resulting I digital signal from A/D converter 102 is then supplied to delay circuit $104_I$ and a latch $106_I$. Similarly, the resulting Q digital signal from A/D converter 102 is supplied to delay circuit $104_Q$ and a latch $106_Q$. Delay circuits $108_I$ and $108_Q$ are each configured to act as a 1-bit storage devices to store $S_{I0}$ and $S_{Q0}$, respectively. The outputs, following a delay time, from delay circuits $104_I$ and $104_Q$ are then supplied to latches $108_I$ and $108_Q$, respectively.

Latches $106_I$, $106_Q$, $108_I$ and $108_Q$ are used for synchronization purposes, such that the appropriate data, in accordance with equations 3 and 4, is provided to respective multipliers $110_I$ and $110_Q$. The resulting outputs from multipliers $110_I$ and $110_Q$ are provided to summation device 112. The output of summation device 112 represents the originally encoded data. It is noted that elements $104_I$–$110_I$ make up coding circuitry $114_I$, and similarly elements $104_Q$–$110_Q$ make up coding circuitry $114_Q$.

Using receiver 100, at each rising edge of the recovered clock, the data from the I and Q signals provides a data point in a two dimensional plane (see FIG. 1). The goal of differential decoding is to retrieve the original data that is encoded in the distance between two adjacent data points. Receiver 100 achieves this in two basic steps, namely a multiply step and a summation step.

For each channel (i.e., the I and Q signals), the product of the two adjacent outputs is calculated by multipliers $110_I$ and $110_Q$. In this manner, the result is coded into a format that the decision making of the data distance in the two-dimensional plane can be accomplished by simply adding the results of the two channels, using summation device 112, rather than calculating the length of the vector.

FIG. 3 depicts a table 120 containing decision information that can be implemented in receiver 100, to identify the distinct digital data values contained within the DBPSK signal, in accordance with the present invention. As shown in table 120, the output of each channel is digitized at the clock rate into a 2-bit digital format. Thus, the possible outputs are 00, 01, 10, and 11. To preserve linearity of the data distance, the product of the adjacent data samples in each channel is coded according table 120. The coding occurs in multipliers 110I and 110Q, or other similarly configured logic. When the coded results for each of the channels are added together using summation device 112, the carrier to the upper level of the adder or adder function will yield the original data as encoded in the DBPSK signal.

Although certain embodiments in accordance with the present invention, are depicted in the accompanying Drawings and described in the foregoing text, it should be understood that the invention is not limited to the embodiments disclosed, but is capable of numerous rearrangements, modifications and substitutions without departing from the spirit of the invention as set forth and defined by the following claims.

What is claimed is:

1. A receiver for receiving and recovering data from a differential phase shifted keyed signal, said receiver comprising:

an analog-to-digital converter having first and second inputs, and first and second outputs, said analog-to-digital converter for receiving an analog in-phase (I) signal at said first input, and for receiving an analog quadrature-phase (Q) signal at said second input, said analog-to-digital converter further for outputting at said first output digital in-phase (I) data, and for outputting at said second output digital quadrature-phase (Q) data, wherein the I data is represented by two bits per sample;

a first coder connected to said first output of said analog-to-digital, said first coder for receiving the digital I data from said analog-to-digital converter, and said first coder further for outputting corresponding coded I data as a function of a first I data portion and a subsequent second I data portion from the digital I data, in accordance with a table

|    | 00   | 01   | 11   | 10   |
|----|------|------|------|------|
| 00 | 1110 | 1010 | 0000 | 0100 |
| 01 | 1010 | 1000 | 0100 | 0110 |
| 11 | 0000 | 0100 | 1110 | 1010 |
| 10 | 0100 | 0110 | 1010 | 1000 | a second coder connected to said second output of said analog-to-digital converter, said second coder for receiving the digital Q data from said analog-to-digital converter, and said second coder further for outputting corresponding coded Q data as a function of a first Q data portion and a subsequent second Q data portion from the digital Q data, respectively; and a summation device connected to each of said first coder and said second coder, said summation device for receiving the coded I data from said first coder and for receiving the coded Q data from said second coder, said summation device further for generating a single corresponding decoded data value by combining the coded I data and the coded Q data.

2. The receiver as recited in claim 1, wherein said first coder includes a first latch connected to said first output of said analog-to-digital converter.

3. The receiver as recited in claim 2, wherein said first coder includes a delay connected to said first output of said analog-to-digital converter.

4. The receiver as recited in claim 3, wherein said first coder includes a second latch connected to said first delay.

5. The receiver as recited in claim 4, wherein said second coder includes a first latch connected to said second output of said analog-to-digital converter.

6. The receiver as recited in claim 5, wherein said second coder includes a delay connected to said second output of said analog-to-digital converter.

7. The receiver as recited in claim 6, wherein said second coder includes a second latch connected to said delay of said second coder.

8. A method of decoding a baseband DPSK signal, the method comprising:

quantizing an in-phase signal to obtain a digital in-phase signal (I) with two-bit resolution;

quantizing a quadrature-phase signal to obtain a digital quadrature-phase signal (Q) with two-bit resolution;

combining the I signal with a delayed I signal to obtain a maximum likelihood in-phase component in the following proportions:

| I or Q signal | delayed I or Q | maximum phase component |
|---------------|----------------|-------------------------|
| 00 | 00 | 1110 |
| 00 | 01 | 1010 |
| 00 | 10 | 0100 |
| 00 | 11 | 0000 |
| 01 | 00 | 1010 |
| 01 | 01 | 1000 |
| 01 | 10 | 0110 |
| 01 | 11 | 0100 |
| 10 | 00 | 0100 |
| 10 | 01 | 0110 |
| 10 | 10 | 1000 |
| 10 | 11 | 1010 |
| 11 | 00 | 0000 |
| 11 | 01 | 0100 |
| 11 | 10 | 1010 |
| 11 | 11 | 1110; | combining the Q signal with a delayed Q signal to obtain a maximum likelihood quadrature-phase component in the above proportions; and adding the maximum likelihood in-phase component with the maximum likelihood quadrature phase component to determine a maximum likelihood receive data bit.

9. The method of claim 8, wherein the maximum likelihood receive data bit is determined by a carry bit when adding the maximum likelihood in-phase component with the maximum likelihood quadrature phase component.

* * * * *